June 6, 1933.  W. F. NANSTIEL  1,912,493
CONNECTING MEANS
Filed Feb. 21, 1930

INVENTOR:
WILLIAM F. NANSTIEL.
BY Louis A. Maxson
ATT'Y.

Patented June 6, 1933

1,912,493

UNITED STATES PATENT OFFICE

WILLIAM F. NANSTIEL, OF PITTSBURGH, PENNSYLVANIA, ASSIGNOR TO SULLIVAN MACHINERY COMPANY, A CORPORATION OF MASSACHUSETTS

CONNECTING MEANS

Application filed February 21, 1930. Serial No. 430,412.

This invention relates to connecting means, and more particularly to improved means for clutching a plurality of members in fixed or driving relations, such for instance as a driven member to a driving member or vice versa.

In certain types of machinery driving and driven elements thereof are subjected to hard usage and wear, and due to the nature of certain types of these machines they must of necessity be relatively compact. An example of this type of machinery is coal mining equipment such for instance as coal mining machines, and my invention has been shown specifically in connection therewith to illustrate its advantages. It will of course be understood that my improved arrangement is also applicable to other types of machinery where the above conditions of use and compactness may or may not be present or where it may be desirable to connect a member adapted for movement to a stationary member and thus prevent such movement.

It is an object of my invention to provide an improved clutch mechanism for connecting two members in fixed relation, such as driving and driven members, for example, respectively a driving gear and a cutter chain driving sprocket of a coal mining machine. It is a further object of my invention to provide an improved clutch mechanism having improved means whereby elements of the clutch which directly effect the driving connection may be easily and readily removed without undue effort on the part of the mechanic or excessive dismantling of the machine. A further and more specific object in this respect is to provide an improved type of pin clutch permitting the pins to be only partially supported by an actuating member and yet be held in operative relation thereto by one of the driving or driven members. Another object is to provide an improved arrangement of parts whereby the pins are held against radial displacement by one or the other of the driving or driven members and are freely supported by a shifting member with an improved arrangement between the pins and shifting member, permitting lateral or radial removal or insertion of the pins with respect thereto. This arrangement is especially conducive to compactness, eliminating the necessity of any great amount of axial separation between certain elements of the machine during the insertion or removal of pins. As the pins in the specific form herein shown, are loosely supported by the shifting member they may be easily aligned with the cooperating supporting and guiding openings in, say, the driving member. Other objects and advantages of my invention will be apparent to those skilled in the art from the following description of the accompanying drawing in which, Fig. 1 is a side elevation of a coal mining machine with the cutter bar broken off and parts broken away to show details of the cutter chain driving mechanism.

Figure 1:
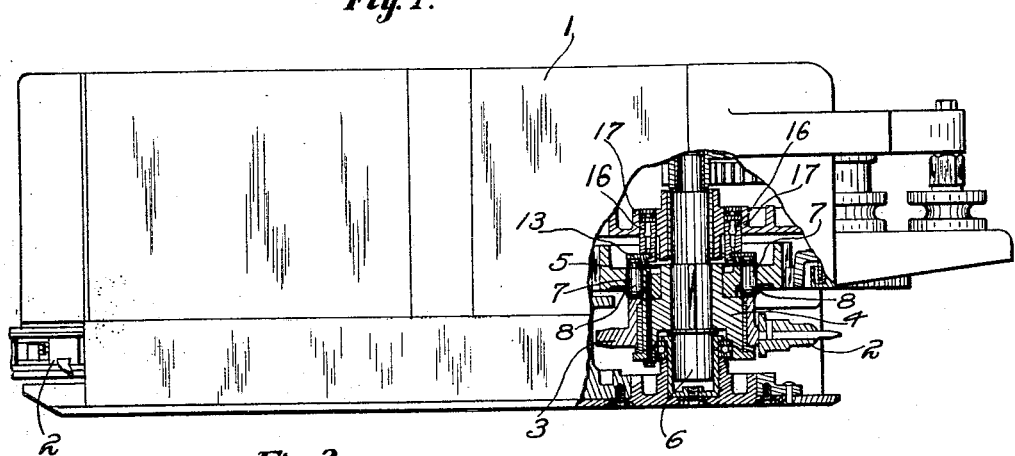
Figure 2:
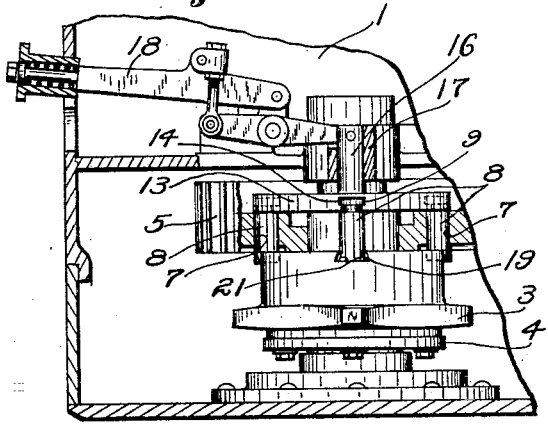
Fig. 2 is an enlarged fragmentary partial sectional view of the clutch arrangement.

While I have shown my invention in connection with a coal mining machine it will of course be understood, as previously pointed out, that the invention is applicable to various types of machines, although it is peculiarly adapted to a mining machine of the class and type described herein.

The mining machine 1 may be of any usual type having, as is well understood in the art, a cutter bar carrying a cutting chain 2 extending outwardly from the machine in any one of various suitable directions and with suitable mechanism for driving the chain, such for instance as a driving sprocket 3 journaled upon a sleeve or hub 4 to which a gear 5 is bolted, or otherwise suitably secured thereto, and which hub is also keyed to a driving shaft 6. The gear 5, which may be considered as the driving member, might, in a different mechanism, drive other devices than the sprocket 3, and may herein drive other devices in addition to the sprocket.

Figure 3:
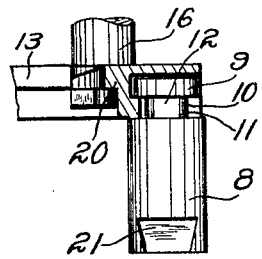
Fig. 3 is an enlarged fragmentary view showing one of the clutch pins in operative relation to the shifting member.
Figure 5:
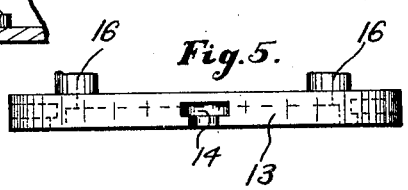
Fig. 5 is a side elevation of the shifting ring.
Figure 4:
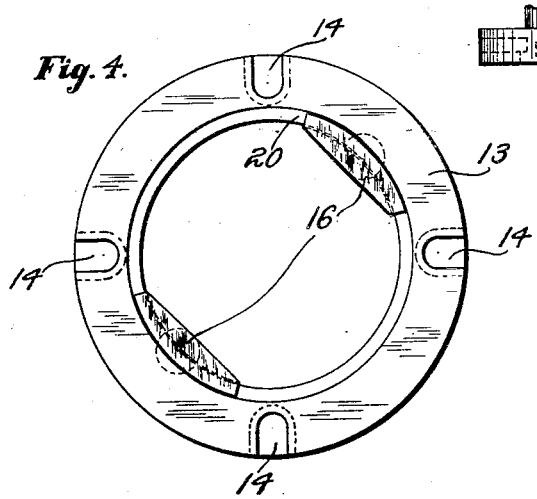
Fig. 4 is a plan view of the shifting ring.

Herein, to connect the gear 5 and sprocket 3 in fixed driving relation, there is provided in the gear 5 a series of openings 7, herein four, equally angularly spaced and extending parallel to the axis of the gear 5, and in these are slidably supported and guided, cylindrical pins 8. The upper end of each of the pins 8 has a reduced head 9 (Fig. 3), and an annular recess 10 to form a neck 11 provided with flattened portions 12 preferably on each side thereof. To move the pins axially into or out of engagement with the sprocket 3, there is provided an annular shifting ring 13 having (as shown in Figs. 4 and 5), a series of T-shaped slots 14, each adapted to receive a pin head 9 with the flattened portions 12 engaging the sides of the lower portion of the T-slot, thus preventing rotation of the pin relative to the shifting ring and yet permitting the pins to be readily removed in a radial direction. Normally they are held in fixed radial relation to the axis of the driving shaft 6 by the driving gear 5.

The shifting ring may be moved axially by suitable and usual means, herein a pair of shifters 16 disposed at diametrically opposite points and slidably supported by a suitable portion 17 of the machine frame, the upper ends of these shifting pins being connected with any suitable manually operable shifting handle 18. The lower ends of the shifters are each provided with a suitable recess adapted to engage an inwardly extending radial flange 20 on the shifting ring 13 to provide a tongue and groove type of slidable connection. The shifters are adapted, upon downward movement of handle 18, to move annular shifting ring 13 upwardly axially of the driving shaft 6 and thereby lift the lower ends of clutch pins 8 out from cooperating dove-tailed radial slots 19 formed in the upper end of the hub of sprocket 3 and thus disconnect the driving and driven members.

The lower ends of the pins are of dove-tail formation with inclined flattened portions 21, thereby holding the pins against accidental axial displacement from the grooves 19 when the members are in driving relation. Due to the flattened portions 12 of the necks 11 preventing rotation of the clutch pins 8 the dove-tailed ends of the pins will always extend in the proper radial direction to drop into the dove-tailed slots 19. The pins 8 may and should be made of special alloy steel or any other material of extreme hardness and heat treated to minimize wear, whereas were they made integral with the shifter ring heat treatment would be difficult due to warping and the use of hard material would make manufacture very troublesome. The portion of the sprocket with which the pins cooperate is also suitably heat treated to resist wear.

It will be understood that to disassemble the clutch mechanism the upper part of the rear end of the machine frame which carries with it the portion 17 will, at a suitable stage in the disassembly of the mechanism, be lifted upwardly and will carry upward with it the ring 13 and the pins 8. When the pins 8 are withdrawn from the openings 7, they may be removed radially from their engagement with the ring 13. By releasing the pins 16 from the lever mechanism which raises and lowers them, they may then be permitted, with the ring 13, to drop downward until they are free from their guides in the portions 17 of the frame, and they may therefore then be moved inwardly radially out of engagement with the flange 20. A process substantially the reverse of that described would obviously be used in assembling the clutch mechanism.

It is thus seen that I have provided an improved pin type of clutch whereby driving and driven members may be positively clutched together, with axially movable pins supported against radial movement and suitably positioned by one of said members, which arrangement is adapted to permit relatively free removal or insertion of the pins, and in addition obtains not only simplicity of design, ease of assembling and dis-assembling, but also the advantage of permitting the shifting member to be made of relatively inexpensive yet sufficiently durable material while making the pins of relatively tough and hardened material so as to withstand the strain and wear to which they are subjected. By the free pin supporting connection with the shifting member, no danger is present, due to hardening of the pins, of causing binding between the pins and the openings in the pin carrying member such as the driving member.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a clutch mechanism, a driving member, a coaxial driven member, one of said members having recesses therein and the other having clutch pins slidable relative thereto for engagement with and disengagement from said recesses, a shifter ring having an inwardly directed flange and movable axially of said members and engaging said pins upon surfaces extending transversely of the axis of the ring to move the pins, in opposite directions, said ring engaging the pins upon surfaces extending longitudinally of the axis of the ring to prevent rotation of the pins on their axes, and means for moving said shifter ring to effect clutch engagement and disengagement including a shifter element directly engaging the flange of said ring and relative to which said ring rotates during rotation of the pin-carrying member.

2. In a clutch mechanism, a driving member, a coaxial driven member, one of said members having a plurality of recesses therein and the other having a plurality of bores therein alinable with said recesses in certain relative positions of said members, clutch pins slidable in said bores, an annular shifter ring, said pins having heads and said ring having recesses opening through one of the arcuate peripheries thereof to receive said heads to maintain said pins in non-rotative relation to said ring and to move said pins axially on movements of the ring axially of said members, and means for moving said ring axially, to effect clutch engagement and disengagement, including shifter members movable only axially and offset from the axis of said driving and driven members and having portions interengaging with the other arcuate periphery of said ring.

3. In a clutch mechanism, a driving member, a coaxial member to be driven, recesses having undercut walls in said driven member, bores in said driving member alinable with the recesses in the driven member, pins slidable in said bores and having ends formed to interengage with the walls of said recesses, a shifter ring, said ring and pins having portions interengageable by movement of said pins in lines radial with respect to said ring and cooperating to prevent rotation of said pins on their own axes, and means for shifting said ring including a plurality of shifting pins reciprocable on fixed lines offset from but parallel to the axes of said driving and driven members and having a tongue and groove sliding connection with the inner side of said ring.

In testimony whereof I affix my signature.

WILLIAM F. NANSTIEL.